H. CHRISMAN.
WATER METER.
APPLICATION FILED JUNE 12, 1906.
1,031,689.
Patented July 9, 1912.
3 SHEETS—SHEET 1.
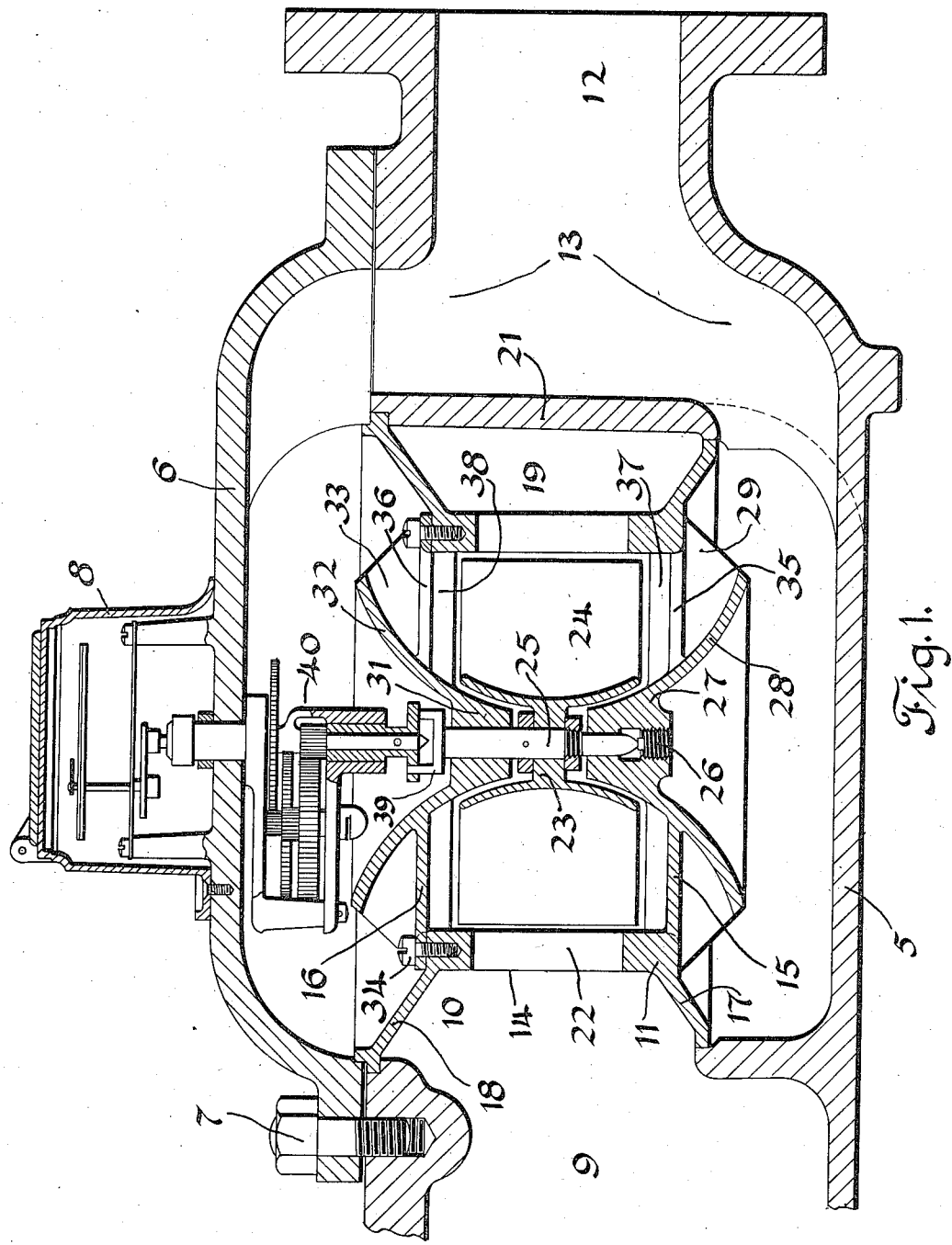
WITNESSES:
INVENTOR.
Horace Chrisman
BY
ATTORNEY.

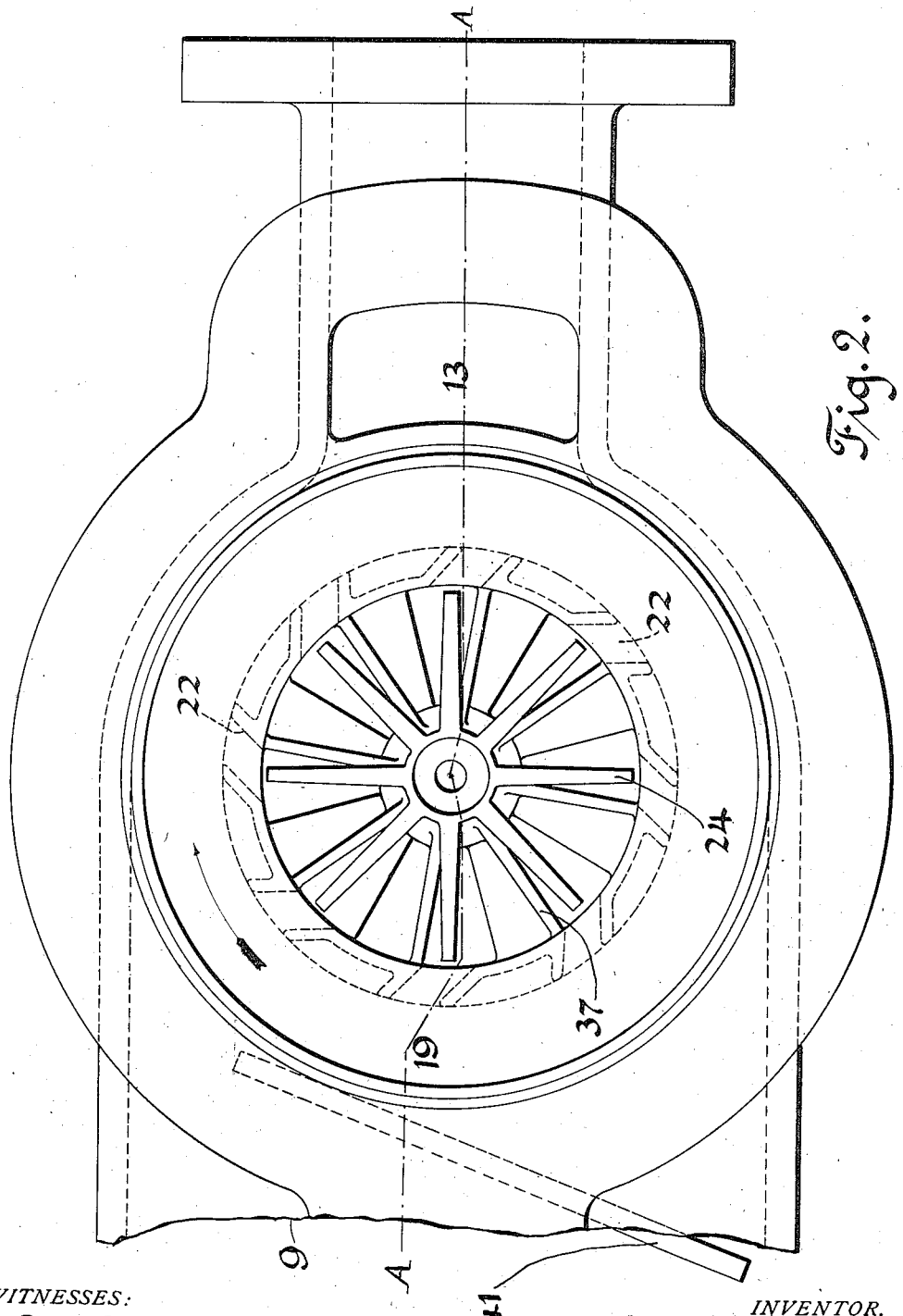

H. CHRISMAN.
WATER METER.
APPLICATION FILED JUNE 12, 1906.

1,031,689.

Patented July 9, 1912.

3 SHEETS—SHEET 3.

WITNESSES:

INVENTOR.
Horace Chrisman
BY
ATTORNEY.

UNITED STATES PATENT OFFICE.

HORACE CHRISMAN, OF EDGEWOOD, PENNSYLVANIA, ASSIGNOR TO PITTSBURG METER COMPANY, A CORPORATION OF PENNSYLVANIA.

WATER-METER.

1,031,689. Specification of Letters Patent. Patented July 9, 1912.

Application filed June 12, 1906. Serial No. 321,378.

*To all whom it may concern:*

Be it known that I, HORACE CHRISMAN, a citizen of the United States, and a resident of Edgewood, in the county of Allegheny and State of Pennsylvania, have made a new and useful Invention in Water-Meters, of which the following is a specification.

This invention relates to water meters and has for an object the production of a simple but efficient meter in which a new and improved arrangement and combination of parts is utilized.

This and other objects I attain in a meter embodying the features herein described and illustrated in the several sheets of drawings accompanying this application and forming a part thereof.

Figure 4:
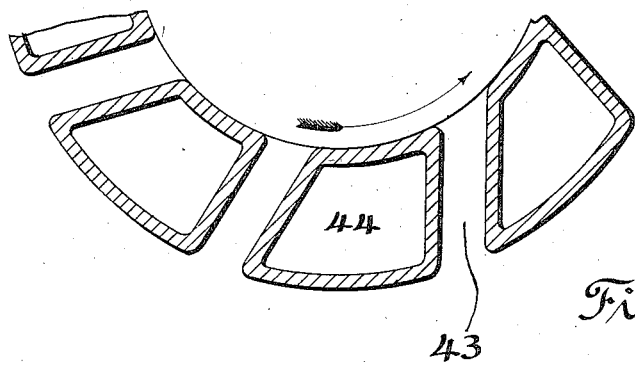
Figure 3:
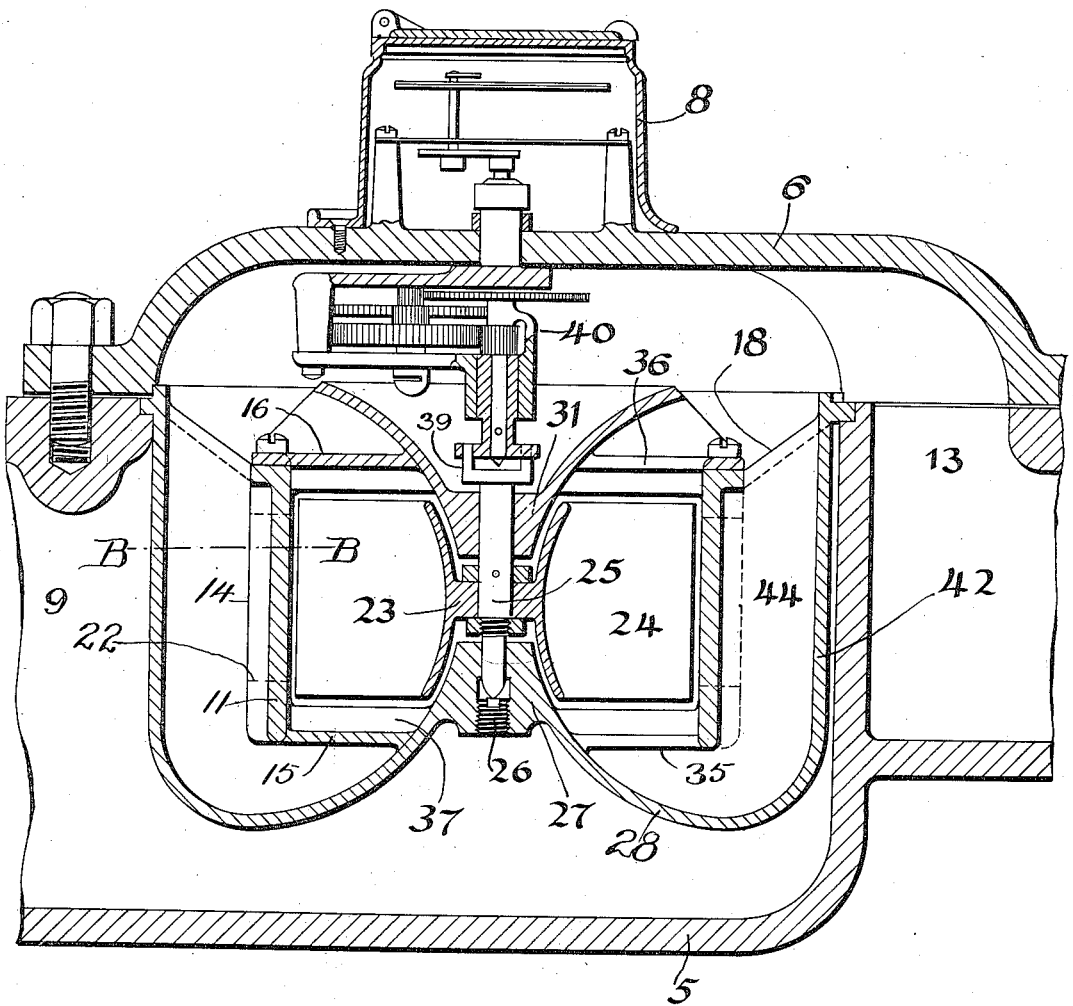

Figure 1 is a vertical section along the broken line A—A of Fig. 2; Fig. 2 is a plan view of the meter shown in Fig. 1, a portion having been removed for convenience of illustration; Fig. 3 is a vertical section, corresponding to the section in Fig. 1, of a modification of my invention; and Fig. 4 is a partial section along the line B—B of Fig. 3.

Referring to Figs. 1 and 2: The meter casing consists of a bottom portion 5 and a top portion 6 secured to the bottom portion by bolts 7, and which carries an indicating apparatus 8. The bottom portion is provided with a liquid inlet port (not shown), which communicates, through a passage 9, with a chamber 10, located centrally within the meter casing. A wing wheel casing 11 is located in the chamber 10 and a discharge port 12, formed in the lower portion 5 of the casing, communicates therewith through a passage 13. The wing wheel casing consists of a cylindrical portion 14, a bottom portion 15, integrally formed therewith, and a removable top portion 16. The cylindrical portion 14 is provided with integrally formed annular flanges 17 and 18 which are supported by suitable surfaces located on the walls of the bottom portion 5.

The flanges 17 and 18 are so arranged that an annular passage 19 is formed between the cylindrical portion 14 and a wall 21 of the meter casing, and the wheel casing 11 is rigidly locked in position when the top portion 6 of the meter casing is secured in place.

The wall 14 of the casing 11 is provided with a suitable number of ports 22, which extend therethrough and are a means of communication between the passage 19 and the interior of the wheel casing.

A wing wheel 23 is provided with a suitable number of radially-extending blades 24 and is mounted within the casing 11 on a vertical spindle 25. The spindle 25 is provided with an adjustable step bearing 26 supported by a conical hub portion 27 formed integrally with the bottom portion 15. The hub portion 27 is provided with a conoidal trumpet or cone-shaped flange 28, between which and the bottom portion 15 a number of integrally-formed vertically-disposed radial webs 29 are interposed.

The top portion 16 is provided with an integrally-formed hub portion 31 similar to the hub portion 27, and through which the vertical spindle 25 extends. A conical flange 32, integrally formed with the hub portion 31, and integrally-formed webs 33, which correspond in position and location to the webs 29 of the bottom portion 15, are provided between it and the top portion 16. The top portion 16 is adapted to be secured to the cylindrical portion 14 by screws 34.

The conoidal flanges 28 and 32 of the bottom and top portions, respectively, coöperate with the flanges 17 and 18 of the cylindrical portion 14 to form annular passages, which communicate with ports 35 and 36, formed in the bottom and top portions respectively. The ports 35 and 36 communicate with the passage 13 through the above mentioned annular passages, formed by the flanges 17 and 18 and the flanges 28 and 32.

Radially-extending vertically-disposed retarding vanes 37 are mounted on the bottom portion 15 within the casing 11 adjacent to the ports 35 and retarding vanes 38, similarly located with reference to the ports 36, are mounted on the top portion 16 within the casing.

The spindle is provided with a pin connection 39 through which it operates a system of gears 40, comprising the operating mechanism of the indicating apparatus of the meter.

A baffle plate 41 extends across the inlet passage 9 of the meter casing and causes the liquid entering the passage 19 to whirl in the direction of the arrow, shown in Fig. 2.

The operation of the meter is as follows: The water entering the passage 9 through the inlet port of the meter casing must pass through the ports 22 of the cylindrical portion 14, the interior of the wheel casing 11 and the ports 35 or 36 of the casing 11, before it is discharged through the discharge port 12. The baffle plate 41 gives to the water passing through the passage 19 a whirling motion which tends to overcome its tendency to enter the ports 22 of the cylindrical portion 14, which are located directly opposite to the admission passage 9.

The ports 22 of the cylindrical portion 14 are so positioned and arranged that the water passing through them and entering the interior of the casing 11 is caused to impinge upon the blades 24 of the wing wheel 23 and cause it to revolve in a direction indicated by the arrow in Fig. 4. The ports 35 and 36 are of such area, relative to the inlet ports 22, that the water in passing through the interior of the wheel casing 11 is divided, a portion being discharged through the ports 35 in the bottom portion, and a portion through the ports 36 in the top portion of the casing, thus maintaining a balance on the propeller 23.

The retarding vanes 37 and 38 are so positioned and arranged that they cause eddy currents within the casing 11 during the operation of the meter, which tend to retard the wheel. Under ordinary conditions the wheel tends to move faster in proportion to the amount of water passing through the meter, for heavy flows than for light flows, since the retarding resistance, which is the mechanical inefficiency of the apparatus, remains constant, but the accelerating force increases as the flow of water through the meter increases. With the retarding vanes positioned as illustrated, the effect of the eddy currents increases approximately in direct proportion to the increase of flow through the meter, and consequently the retarding force increases with the wing wheel accelerating force and the tendency of the indicating apparatus to over register for heavy flows is overcome.

A modification of my invention is shown in Figs. 3 and 4. The wing wheel 23, which, as before, is mounted on a spindle 25, is located within a wheel casing which comprises a cylindrical portion 14 with a bottom portion 15 and a removable top portion 16, formed substantially in the same manner as in Fig. 1. The annular flange 28 of the hub portion 27, however, is extended into a cylindrical shell 42, which is integrally formed with an annular flange 18 of the cylindrical portion 14. The water entering the interior of the wheel casing traverses passages 43, formed between the shell portions 11 and 42, and which communicates with the inlet ports 22. By this arrangement the water discharged from the interior of the wheel casing through the ports 35 is conveyed through passages 44, formed between the passages 43, the cylindrical portion 14 and the shell portion 42, to a passage located above the wheel casing and, as in Fig. 1, the wing wheel is balanced for all flows of water.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim is:

1. In a water meter, a wheel casing provided with outlet ports and peripherally disposed inlet ports, a wing wheel located between the outlet ports and conoidal deflectors arranged on opposite sides of said wheel and adjacent to said outlet ports.

2. In a water meter, a wing wheel, a casing therefor comprising a cylindrical portion and two conoidal portions, a mounting shaft for said wheel carried within said conoidal portions, and an outer casing.

3. In a water meter, a wing wheel, bearings therefor located above and below said wheel and conoidal members supporting said bearings and adapted to direct the flow of water leaving said wheel.

4. In a water meter, a wing wheel, a casing therefor, bearings for said wheel located above and below said wheel and supported by said casing, and conoidal flanges formed integrally with each bearing and operating to direct the flow of water from said wheel.

5. In a water meter, a wing wheel, bearings therefor located above and below said wheel, and conoidal flanges formed integrally with each bearing and operating to direct the flow of water from said wheel.

6. In a water meter, an outer casing, a wing wheel, and a casing therefor supported within the outer casing and having conoidal deflectors located above and below said wheel.

7. In a water meter, an outer casing, a wheel casing within the outer casing and having inlet and outlet ports, a wing wheel within said wheel casing, and conoidal members coöperating with the wheel casing for directing the flow of water leaving said wheel casing, one conoidal member being formed integrally with said wheel casing.

8. In a water meter, an outer casing, a wheel casing within the outer casing consisting of a cylindrical portion provided with inlet ports and top and bottom portions provided with outlet ports, and cone-shaped deflector members located adjacent said outlet ports.

9. In a water meter, a meter casing, a wing wheel located therein, a wheel casing for said wing wheel consisting of a cylindrical portion surrounding said wheel and a top and bottom portion respectively located above and below said wheel, a conoidal flange and a plurality of radially extending retarding vanes secured to said top portion and supporting a wheel bearing located above said wheel, and a conoidal flange and retarding vanes secured to said bottom portion and supporting a step bearing located below said wheel.

10. In a water meter, a meter casing, a wing wheel located therein, a wheel casing surrounding said wing wheel and comprising a cylindrical portion and a conoidal flange secured to said cylindrical portion and supporting a wheel bearing located above the wheel, there being a conoidal flange at the lower end of the cylindrical portion said flange supporting a step bearing for said wheel.

11. In a water meter, an outer casing provided with a removable cover, an inner or wheel casing having outlet ports in its top and bottom and held in place within the outer casing by means of said cover, a removable top for the wheel casing, and trumpet-shaped deflectors adjacent said outlet ports.

12. In a water meter, an outer casing provided with a removable cover, an inner or wheel casing having outlet ports in its top and bottom and held in place within the outer casing by means of said cover, a removable top for the wheel casing, trumpet-shaped deflectors adjacent said outlet ports, and gearing mechanism between one of said deflectors and the cover of said outer casing.

In testimony whereof, I have hereunto subscribed my name this 11th day of June, 1906.

HORACE CHRISMAN.

Witnesses:
CHARLES W. McGHEE,
E. W. McCALLESTER.